PREPARATION OF MULTIPLE P-N JUNCTION SEMICONDUCTOR CRYSTALS

Filed May 14, 1957 3 Sheets-Sheet 1

INVENTOR.
ALFRED D. LEVITAS

BY Connolly and Hutz

HIS ATTORNEYS

Ge-As-Im
DIFFUSION OUT
EFFECT OF DIFFUSION TIME

Ge-As-Im
DIFFUSION OUT
EFFECT OF INITIAL ACCEPTOR CONCENTRATION

DIFFUSION OUT
WITH AND WITHOUT
ADDITIONAL DONOR
ADDED TO MELT

INVENTOR.
ALFRED D. LEVITAS
BY Connolly and Hutz
HIS ATTORNEYS

Nov. 27, 1962 A. D. LEVITAS 3,066,051

PREPARATION OF MULTIPLE P-N JUNCTION SEMICONDUCTOR CRYSTALS

Filed May 14, 1957 3 Sheets-Sheet 3

INVENTOR.
ALFRED D. LEVITAS
BY
Connolly and Hutz
HIS ATTORNEYS

United States Patent Office 3,066,051
Patented Nov. 27, 1962

3,066,051
PREPARATION OF MULTIPLE P-N JUNCTION SEMICONDUCTOR CRYSTALS

Alfred D. Levitas, Hopkins, Minn., assignor to Sprague Electric Company, North Adams, Mass., a corporation of Massachusetts Filed May 14, 1957, Ser. No. 659,163
1 Claim. (Cl. 148—1.5)

The present invention relates to processes for converting the conductivity type of a portion of a region within the bulk of a crystalline semiconductor and thus producing crystals having conductivity regions in the configurations n-p-n, p-n-p, n-p-n-p, or p-n-p-n in which the thickness of the intermediate regions is very small and subject to accurate control. In particular, it relates to the production of these combinations of grown junctions and diffused junctions within the body of a crystal by means of the diffusion of one type of impurity out of a crystalline semiconductor region containing two types of impurities in order to convert the type of conductivity of that region from n to p or from p to n.

One of the principal types of transistors is the junction transistor in which the operation depends upon the juxtaposition of three or more conductivity regions of alternating types, i.e., n-p-n, p-n-p, n-p-n-p, or p-n-p-n. In the n-type regions, the electrical conduction takes place by means of electrons as a result of a preponderance of donor-type impurities in the crystal. In the case of germanium and silicon crystals, representative donor impurities are elements from the fifth group of the periodic table according to the system of Mendeléeff—boron, aluminum, gallium and indium.

The boundary between two adjacent conductivity regions of opposite conductivity type, p and n, is known as a p-n junction and it has rectification properties, i.e., it conducts electricity more readily in one direction, the "forward" direction than it does in the other, the "reverse" direction.

In a junction transistor which has three conductivity regions of alternating type, there are accordingly two p-n junctions arranged successively in opposite senses. The two possible arrangements are n-p-n and p-n-p. Electrical connections are made to each of the three regions and in normal transistor operation, external voltages are applied between the central region (base region) and the others, so that one junction is conducting in the forward direction (emitter junction) and the other in the reverse direction (collector junction).

In the operation of an n-p-n transistor, application of the electrical signal voltage between the emitter and base produces corresponding changes in the number of electrons which are "injected" from the emitter junction into the p-type base region where they are the minority charge carriers. These electrons diffuse across the base region toward the reverse-biased collector junction, and those that reach it affect the conductivity of the junction, and thus the current flowing in the collector circuit. The effectiveness of the transistor operation can thus be regarded as depending on the effectiveness of three component operations: the injection of electrons from the emitter junction; their transport across the base region; and their collection by the collector junction. In more specific terminology, the current gain ($\alpha$) of the transistor is the product of the emission efficiency ($\gamma$), the transport efficiency ($\beta$), and the collection efficiency ($\alpha^*$).

In general, high values of current gain are desirable, but although it is possible to obtain values somewhat greater than unity, the usual application of the two-junction transistor (n-p-n or p-n-p) requires an alpha less than but close to unity. The component factors $\gamma$ and $\beta$ are necessarily less than unity, but can be made to approach unity closely by proper design. The factor $\alpha^*$ can be made somewhat greater than unity, making $\alpha$ greater than unity, but it is usually not desirable to do so because certain unwanted features result. In producing the n-p-n or p-n-p configuration to be used in the transistor, it is the detailed distributon of the impurities within each of the conductivity regions and the geometrical features of the regions themselves which must be controlled closely to obtain the high value of alpha as well as the other important characteristics required for specific applications.

In obtaining a high value of emission efficiency $\gamma$, it is desirable that the excess donor impurity concentration in the emitter region be high, considerably higher than the excess acceptor impurity concentration in the adjacent base region and, in fact, that the transition be an abrupt one. To obtain a high value of transport efficiency $\beta$ it is essential that the electrons injected into the base region have a very high probability of crossing it before recombining with holes, or in other words, that the base width be much less than their diffusion length. This requires a base width no greater than a few mils, but a more stringent restriction on base width is supplied when the application requires operation at high frequencies; for example, the width must be less than about 0.1 mil for operation above 100 megacycles. A further improvement in high frequency operation is obtained by making the impurity distribution in the base region non-uniform so that the concentration decreases from the emitter junction to the collector junction. This non-uniformity produces a "built-in" electric aiding field which causes the injected carriers to move more rapidly toward the collector. Operation of the collector at high voltages requires that the change of net impurity concentration at the collector junction be a gradual one, and that the impurity concentration be considerably lower on the collector side than on the base side.

The preceding discussion has related to transistors having only three conductivity regions n-p-n or p-n-p. However, by including an additional region to make an n-p-n-p configuration, it becomes possible to make a three terminal transistor with improved properties, or two-terminal or four-terminal devices with different properties than those described. The former has been called a "hook-collector" transistor and may be considered as operating in a manner similar to that already described, but with a collection efficiency so vastly increased that values of alpha as high as 70 are obtained. An n-p-n-p hook-collector transistor has an additional p-type region and, consequently, an additional n-p junction, added to the right end of the n-p-n configuration discussed above. This additional n-p junction is designated the "hook" junction and the voltage applied between the base and the collector terminal (which is now attached to the added p-type region) causes the hook junction to conduct in the forward direction, injecting holes into the n-type collector region. The collection efficiency of the combined collector and hook junctions can be much greater than unity because the effect on the collector junction conductivity by a group of electrons diffusing to it from the emitter junction on one side is greatly augmented by that of a much larger group of holes diffusing to it from the hook junction on the other side where they are injected as a result of the effect of the electrons on the collector junction. The width of the n-type region between the collector and hook junctions is subject to the same considerations as those previously mentioned for the base region in the n-p-n structure and, consequently, this region must be about as narrow as the base region which it adjoins.

Several techniques have been utilized in the prior art to produce multiple-junction configurations of the grown-junction and diffused-junction types, the latter type involving solid-state diffusion of an active doping impurity into a crystalline region to convert its conductivity type. These prior techniques include: (1) successive doping of the melt from which a crystal is growing; (2) changing the conditions of growth of a crystal from a melt containing more than one impurity; (3) surface-melting or re-melting portions of a crystalline wafer containing one or more impurities, sometimes combined with (1) or (2); (4) solid-state diffusion of one or more impurities into a crystalline wafer from the surface to convert the conductivity type of a region or regions adjacent to the surface; and (5), a combination of (1), (2) or (3) with solid-state diffusion of an impurity at the boundaries so created within the body of a crystalline wafer in which the diffusion process converts the type of conductivity in a region by the diffusion of an impurity into it from an adjacent region.

Each of these techniques has limitations inherent in the nature of the process which the present invention overcomes. Techniques (1), (2) and (3) are not able to produce consistently the thin base regions required for high-frequency operation. Technique (4) can produce thin base regions consistently, but introduces problems of electrode attachment, a greater effect of surface conditions, and undesirable effects, due to a very thin emitter or collector region. Furthermore, when double diffusion of both donor and acceptor impurities is used, the emitter junction is a gradual junction, which tends to reduce the injection efficiency, and the impurity distribution within part of the base region is such that a "built-in" retarding field is formed which tends to impair high frequency operations. Technique (5) overcomes most of the limitations mentioned for the other techniques, but is also limited at the present time in the type of configuration it can produce an account of the values of the diffusion coefficients of the common donor and acceptor impurities, i.e., p-n-p in germanium and n-p-n in silicon. Furthermore, in order to obtain the optimum properties in transistors made by this technique, it is necessary that one impurity greatly exceed the other in the initial crystal, and consequently it is difficult to make an accurate check on the all-important ratio of the two impurities.

It is an object of the present invention to overcome the limitations of these techniques of the prior art. It is a further object of this invention to convert a part of a region of a crystalline semiconductor containing both donor and acceptor impurities to the opposite conductivity type by allowing the majority impurity to become the minority impurity by means of the solid-state diffusion of a portion of the majority impurity out of the region. It is still a further object of the present invention to produce triple and quadruple configurations of conductivity regions from two initial regions within the body of a crystalline semiconductor by converting the conductivity type of portions of one or both of the initial regions to form one or two new regions, one of the new regions resulting from the solid-state diffusion of one type of impurity out of the regions containing both types of impurities. It is a still further object of the present invention to control the geometrical configuration of these regions and the distribution of impurities within them in order to achieve certain characteristics required of transistors in various applications.

The invention can be better understood by reference to the accompanying drawings in which.

Figure 3A:
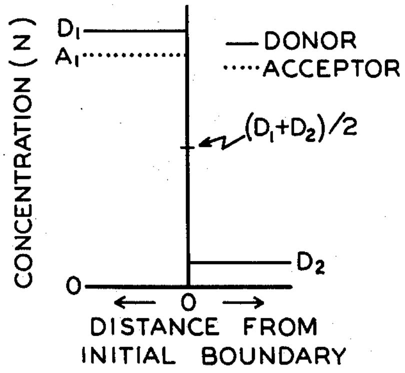
Figure 3B:
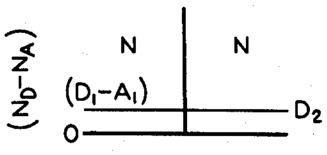

FIGS. 3(*a*) and 3(*b*) are plots of the distribution of two impurities—one donor and one acceptor—near the boundary between two regions of a crystal where the concentrations are suitable for converting the conductivity type of a portion of one region and thus producing an n-p-n configuration by solid-state diffusion of the donor impurity out of that region. FIG. 3(*a*) shows the total amount of each type of impurity and FIG. 3(*b*) shows the excess of one type over the other.

Figure 4A:
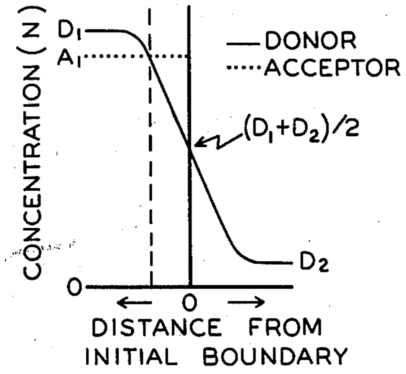
Figure 4B:
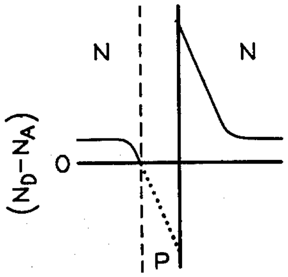

FIGS. 4(*a*) and 4(*b*) are plots of the distribution of two impurities—one donor and one acceptor—showing the conversion of the conductivity type of a portion of one initial region and the formation of an n-p-n configuration from the initial distribution shown in FIGS. 3(*a*) and 3(*b*) by means of solid-state diffusion of the donor out of that region. FIG. 4(*a*) shows the total amount of each type of impurity and FIG. 4(*b*) shows the excess amount.

Figure 5A:
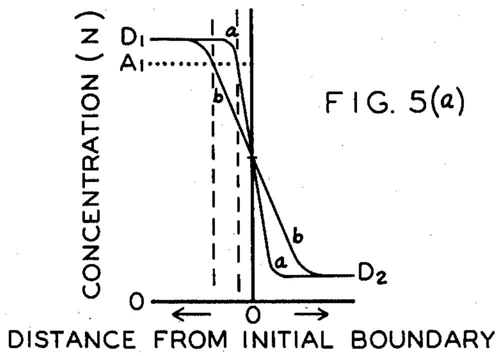
Figure 5B:
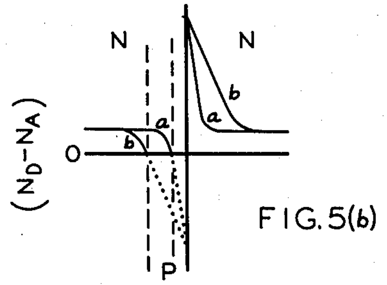

FIGS. 5(*a*) and 5(*b*) are plots of the distribution of two impurities—one donor and one acceptor—showing the differences in the distribution and in the resulting n-p-n configurations when two different durations of solid-state diffusion are used. FIG. 5(*a*) shows the total amount of each impurity and FIG. 5(*b*) shows the excess amount.

Figure 6A:
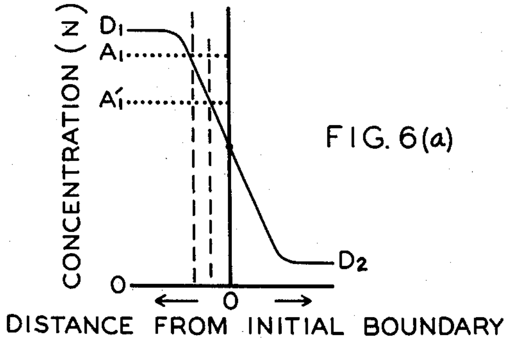
Figure 6B:
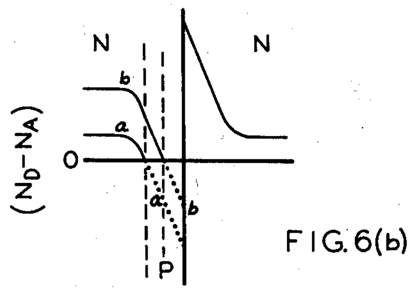

FIGS. 6(*a*) and 6(*b*) are plots of the distribution of a donor impurity and an acceptor impurity in an n-p-n configuration after solid-state diffusion, showing the effect of different acceptor concentrations on the high-concentration side of the initial boundary. The figures show the total and excess amounts of impurity, respectively.

Figure 7A:
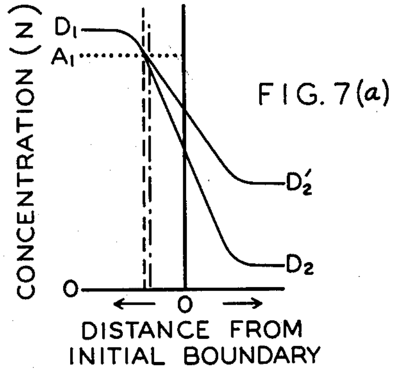
Figure 7B:
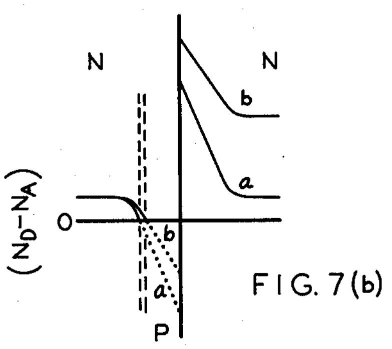

FIGS. 7(*a*) and 7(*b*) are plots of the distribution of a donor impurity and an acceptor impurity in an n-p-n configuration after solid-state diffusion, showing the effect of different donor concentrations on the low-concentration side of the inital boundary. The figures show the total and excess amounts of impurity, respectively.

Figure 1:
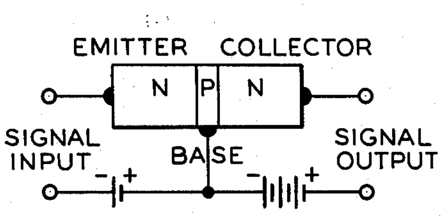
FIG. 1 is a graphical representation of an n-p-n junction transistor with external voltages applied between its three electrodes so that the left-hand n-p junction is conducting in the forward direction (emitter junction) and the right hand p-n junction is conducting in the reverse direction (collector junction).
Figure 8:
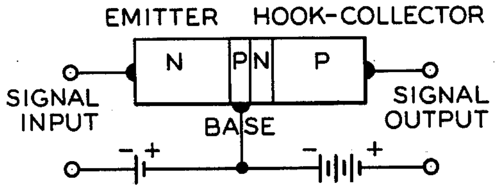

FIG. 8 is a graphical representation of an n-p-n-p configuration of conduction regions utilized as a three-terminal "hook" transistor, an n-p "hook" junction having been added to the n-p-n transistor shown in FIG. 1.

Figure 9A:
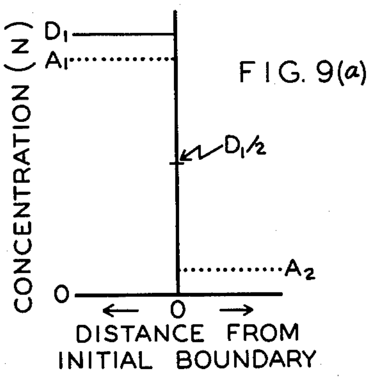
Figure 9B:
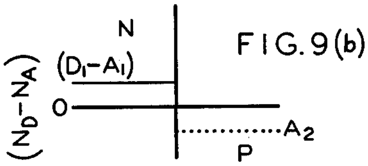

FIGS. 9(*a*) and 9(*b*) are plots of the distribution of a donor impurity and an acceptor impurity near the boundary between two regions of a crystal where the concentrations are suitable for producing an n-p-n-p configuration from two initial regions by solid-state diffusion of the donor impurity out of one initial region into the other. The figures show the total and excess amounts of impurity, respectively.

Figure 10A:
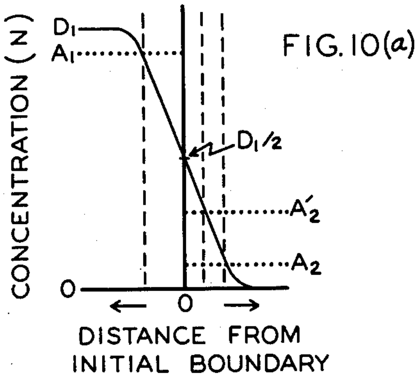
Figure 10B:
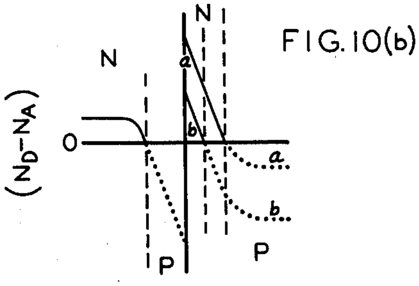

FIGS. 10(*a*) and 10(*b*) are plots of the distribution of a donor impurity and an acceptor impurity in an n-p-n-p configuration after solid-state diffusion of the donor impurity, showing the effect of different acceptor concentrations on the low-concentration side of the initial boundary. The figures show the total and excess amounts of impurity, respectively.

Figure 11A:
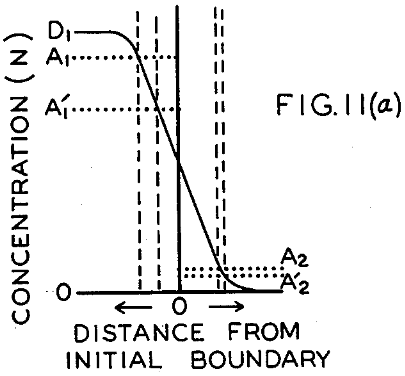
Figure 11B:
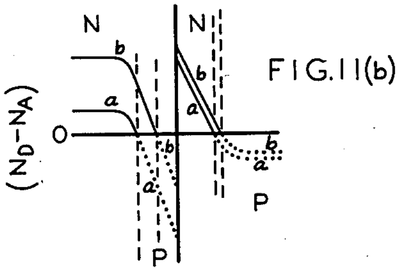

FIGS. 11(*a*) and 11(*b*) are plots of the distribution of a donor impurity and an acceptor impurity in an n-p-n-p configuration after solid-state diffusion of the donor impurity, showing the effect of different acceptor concentrations on the high-concentration side of the initial boundary. The figures show the total and excess amounts of impurity, respectively.

Referring again to FIG. 1, the n-p-n junction transistor depicted is the type which can be fabricated with germainum and the doping impurities which are commonly available, utilizing the technique of the present invention. The p-type base region can be made quite narrow, which is vital for transistor opeartion at high frequencies, and this width can be readily controlled to obtain the desired characteristics.

In the technique of the present invention, the base region is formed by heating a germanium crystal having two adjoining regions of different impurity concentrations to a suitable temperature so that one type of impurity diffuses from one region to the other, allowing a portion of the first region to convert its type of conductivity. In germanium the commonly used donor-type impurities diffuse much more readily than the acceptor-type impurities, so much so that the movement of the latter during the process can be disregarded and will not be considered in the following discussion. The particular impurity of each type to be used can be selected from consideration of the method used to produce in the crystal the two adjoining regions having different impurity concentrations and of the ease of attaining the useful ranges of concentrations in these regions.

Figure 2:
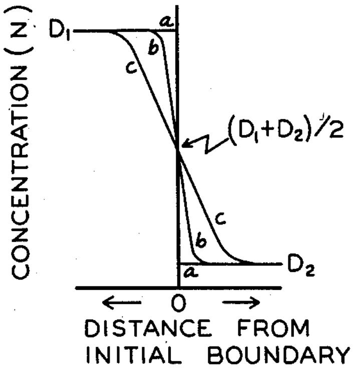
FIG. 2 is a plot showing the effect of solid-state diffusion of an impurity on its distribution near a boundary between two regions of a crystal where the initial concentrations are different.

The change in distribution of a donor impurity produced by solid-state diffusion at a temperature above 500° C. is shown in FIG. 2. Curve *a* of the plot shows the distribution in the vicinity of a boundary between two regions of a crystal which contain different concentrations of the impurity. The ordinate is the concentration (N) of the impurity and the abscissa is distance in the crystal. Abrupt changes of impurity concentration of this type have been produced in several ways, including changes in growth rate or in concentration of impurity in the melt while growing a crystal, but the following discussion will be based on those produced by the process variously called "surface melt" or "melt-back." However, it should be understood that the present invention is not limited to distributions produced by this process, but utilizes those produced by any means. Any process which can produce impurity concentration ratios of the required values may be used.

In the surface-melt or melt-back process a monocrystalline plate of germanium is partially melted, for example, from above by means of a heater suspended just above it, and then is cooled so that the molten germanium solidifies into a single-crystal structure on the solid base which acts as a seed for crystallization. If the rate of cooling and the resulting rate of growth are low so that equilibrium conditions are nearly attained, the ratio of the concentrations of a single impurity in the re-grown and original portions of the crystal is given by the distribution coefficient (B). One donor impurity which has been found useful in fabricating n-p-n configurations by the method of the present invention is arsenic for B is about 0.05. Another suitable donor impurity is phosphorus with B about 0.12. In the following discussion B will be taken to be 0.1. This is the ratio of the impurity concentrations ($D_2/D_1$) in curve *a* of FIG.2 on either side of the boundary between the initial (left) and re-grown (right) regions. It should be noted that the progressive increase in impurity concentration in the re-grown region during solidification (when $B<1$) need not be considered in the following discussion since the changes with which the present invention is concerned take place in a limited region near the boundary where the concentration is essentially uniform.

Curve *b* of FIG. 2 shows the new distribution of the impurity which results after a period of solid-state diffusion of the impurity at an elevated temperature, say 800° C. for Ge, and curve *c* shows the distribution after a longer period of diffusion. The distribution of curve *c* could also have been obtained in the same period of time as that of curve *b* by using a higher temperature, for example 900° C.

The distribution which results from an abrupt, step-function change in concentration through diffusion is described mathematically by means of error functions but, in this and subsequent plots, the distribution after diffusion will be approximately by a line which is straight in the central portion of the region and curves gradually to connect with the initial impurity levels. A characteristic of diffusion of this type is that the impurity concentration at the initial boundary remains constant, equal to the average of the two initial impurity levels on either side, regardless of the extent to which the diffusion process is continued. Both curves *b* and *c* in FIG. 2 have the value $(D_1+D_2)/2$ at the bountary line. If $D_2=0.1D_1$, then the fixed concentration of impurity at the boundary is $$(D_1+0.1D_1)/2=0.55D_1$$

If an acceptor impurity is added to the donor distribution given by curve *a* of FIG. 2 so that its concentration ($A_1$) in the initial crystal region is less than $D_1$, and in the re-grown crystal region is less than $D_2$, the donor impurity predominates in each region before diffusion, and the resulting conductivity is still n-type in both regions. This situation is shown in FIGS. 3(*a*) and 3(*b*) where $A_1=0.9D_1$ and $A_2$ is assumed to be so small it can be neglected compared to $D_2$, which is the case for indium with $B=0.001$. Consequently, the difference between the donor and acceptor concentrations ($N_D-N_A$) is the same in both regions.

Furthermore, since $A_1$ is greater than $(D_1+D_2)/2$, solid-state diffusion allows a portion of the initial crystal region to convert its type of conductivity from n to p, because a sufficient amount of donor impurity has diffused out of this region to allow the acceptor impurity to predominate. This distribution after diffusion is shown in FIGS. 4(*a*) and 4(*b*), where the predominance of acceptor in the central region is indicated in FIG. 4(*b*) as negative values of ($N_D-N_A$).

The two p-n junctions are quite different in character—the one on the right which is located at the initial boundary is produced by the abrupt change of acceptor concentration, but the one on the left is a gradual junction produced by the relatively slow change of donor concentration with distance. The two junctions are, consequently, well suited for use as the emitter and collector junctions, respectively. An abrupt emitter junction has a higher injection efficiency, and a gradual collector junction has a higher breakdown voltage.

When this n-p-n configuration produced by the present invention is used in this way, the re-grown crystal as the emitter region, the excess acceptor concentration within the base region varies in the manner required to improve the high-frequency operation of the transistor. The decreasing concentration from the emitter junction to the collector junction produces a "built-in" electric siding field which causes the injected electrons to move more rapidly to the collector. The presence of such a field has been found to increase the frequency cut-off of a transistor having a given width of base region by as much as 100%.

Since the remaining portion of the initial crystal is used as the collector region, it should have a low concentration of uncompensated donor impurity, i.e., of ($N_D-N_A$) be larger in the base and emitter regions. Close compensation of acceptor and donor impurities can be maintained rather satisfactorily by wellknown crystal-growing techniques, and FIGS. 4(*a*) and 4(*b*), as well as the following illustrations, are based generally on 90% compensation, i.e., $N_A=0.9N_D$. The degree of compensation and thus the suitability of the initial crystal can be determined with satisfactory accuracy, when compensation is close, by resistivity measurements. This is a great advantage of the technique of the present invention using "diffusion out" over the prior art using "diffusion in" because in the latter technique it is desirable that $N_A$ be much larger than $N_D$ in the initial crystal and, consequently, simple resistivity measurements or other means of measuring ($N_A-N_D$) do not indicate $N_D$ or $N_A/N_D$ accurately.

However, even with 90% compensation in the collector region, as depicted in FIGS 4(*a*) and 4(*b*), the general level of ($N_D-N_A$) in the emitter region (away from the junction) is no higher than that in the collector region. It is not the values of concentration immediately on either side of the emitter junction which determine the minority currents and thus the emission efficiency, but rather the total excess impurity contents throughout the base and emitter regions. In order to raise the emitter concentration and thus the emission efficiency, additional donor can be added to the germanium to be re-grown either before or during the surface-melting operation. By this means the ratio of total donor concentrations in the re-grown and original regions is raised, which may be regarded as an increase in the effective distribution coefficient.

The width of the base region, the ratios of the effective impurity concentrations in the three regions, and the distributions within each region are determined principally by the three parameters mentioned: the time or temperature of diffusion; the degree of compensation of impurities in the original crystal; and the addition of donor impurity to the re-grown region. The effect of each of these will be shown in the next three figures.

The effect of diffusion time is illustrated in FIGS. 5(*a*) and 5(*b*). The distribution represented by curve *b* which results from a longer diffusion time (or a higher diffusion temperature) than that of curve *a*, has a smaller concentration gradient. The two principal consequences are a wider base region and a more gradual collector junction.

The effect of the degree of compensation of the donor and acceptor impurities in the initial crystal is shown in FIGS. 6(*a*) and 6(*b*). In FIG. 6(*a*), the two acceptor concentrations $A_1$ and $A_1'$ represent about 90% and 70% compensation, respectively, and the corresponding distributions of $(N_D-N_A)$ are given by curve *a* and curve *b* of FIG. 6(*b*). When the fraction of compensation is smaller, the base width is less, but the excess concentration in the collector region is considerably higher.

When additional donor impurity is added to the re-grown region to raise the effective concentration, the resulting distribution is that shown in FIGS. 7(*a*) and 7(*b*). Although the impurity con entration was quadrupled from $D_2$ to $D_2'$, the base width was narrowed only slightly. The concentration gradient was decreased and consequently the properties of the collector junction were modified, and the effective concentration in the base was decreased somewhat as that in the emitter was increased.

The n-p-n configuration produced by diffusion of a mobile donor out of a crystalline region may also be used in the opposite sense from that previously described. The re-grown region (the region having the lowest concentrations) may be used as the collector. An advantage of this method of utilization is that additional donor need not be added to the re-grown region. In fact, it is generally desirable to use a donor impurity having a distribution coefficient much smaller than 0.1, for example, antimony with $B=0.005$. When the value of B of the donor impurity is nearly as small as that of the acceptor, the concentration of acceptor in the re-grown region may become appreciable and the effects of compensation should be considered. If an effective value of B intermediate between those of two donors such as arsenic and antimony is desired, it may be obtained by using a suitable combination of them in the initial crystal. In this case, the effective diffusion constant of the pair is also intermediate between those of the two components. Of course, when the n-p-n configuration is used in this manner, the two p-n junctions are not the optimum types for their functions, but nevertheless values of alpha as high as 0.97 have been obtained with diffused-emitter-and-base transistors having junctions of this type.

The preceding discussion has been concerned with the n-p-n configuration which is obtained when the technique of the present invention is applied to a semiconductor system in which the donor impurity diffuses more rapidly than the acceptor. Germanium is one such material, all of the commonly used donors diffusing much more rapidly in it than the commonly used acceptors. A semiconductor in which somewhat the opposite is true is silicon, most of the common acceptors diffusing more rapidly in it than donors. Consequently, in silicon the technique of the present invention can readily produce the inverse configuration p-n-p and all of the preceding discussion applies to the case of silicon with appropriate pairs of impurities, for example, boron and arsenic, or boron and antimony, if the terms "donor" and "acceptor", "electron" and "hole", and "n" and "p" are interchanged. It also happens that in silicon there is a pair of impurities, phosphorus and indium, in which the donor, phosphorus, diffuses somewhat more rapidly than the acceptor, indium, and the distribution coefficients are also suitable for producing the n-p-n configuration by the technique of the present invention. In this case the preceding discussion applies to silicon with no changes of terminology. In the case of other semiconductors such as the intermetallic compounds which are now under development and for which very little data on the distribution coefficient and diffusion constant of doping impurities are available, the same considerations apply. It may also be possible, by the appropriate choice of pairs of impurities to obtain both n-p-n and p-n-p configurations in a single semiconductor by the technique of the present invention.

The n-p-n-p configuration which is shown in FIG. 8 utilized as a hook-collector transistor is the result of combining the "diffusion out" technique to convert the conductivity type of a narrow region of a germanium crystal from n to p, as described previously, with "diffusion in" to convert a narrow adjacent region from p to n. The widths of the converting regions can be made quite small which is vital for transistor operation at high frequencies.

The distribution of donor and acceptor impurities which is required in order that solid-state diffusion can produce the quadruple configuration n-p-n-p differs from that required from the triple configuration n-p-n in that the conductivity of the low-concentration region. A suitable distribution which results from the use of the surface-melt process with the doping impurities antimony and gallium is shown in FIGS. 9(*a*) and 9(*b*). The values of the distribution coefficient B are 0.005 and 0.1, respectively. Since B is so small for antimony, the amount of antimony present in the re-grown low-concentration region will be negligible unless, of course, a large amount is added to the molten germanium.

In the case illustrated, the amount of the donor compensated by the acceptor is chosen to be 90%, a value which can be maintained fairly closely by present crystal growing techniques. The impurity distribution which is produced from that of FIGS. 9(*a*) and 9(*b*) by solid-state diffusion is shown in FIGS. 10(*a*) and 10(*b*) as curve *a*. In order that a narrow region on the high-concentration side of the boundary transform from n-type to p-type by diffusion of antimony out, it is necessary that the acceptor concentration $A_1$ in that region be greater than one-half of the initial donor concentration $D_1$, i.e., $D_1>A_1>D_1/2$. In order that a narrow region on the low-concentration side transform from p-type to n-type by diffusion of antimony in, it is necessary that the acceptor concentration in this region $A_2$ be less than $D_1/2$, i.e., $D_1/2>A_2$. Since $B=0.1$ and, consequently, $$A_2=A_1/10$$

the condition for the formation of the quadruple region is $D_1>A_1>D_1/2>A_1/10$.

The distribution of excess impurity which results from solid-state diffusion is essentially, or, more correctly, anti-symmetrical in terms of $(N_D-N_A)$ as shown in curve *a* of FIG. 10(*b*). There is one abrupt p-n junction at the center of the configuration, and there are two gradual junctions, one on either side of it, which have about the same concentration gradients. Consequently, when this configuration is used as a three-terminal hook-collector transistor, none of the three junctions are the optimum type for their function in the device. The emitter and hook-junctions are gradual and the collector junction is abrupt, no matter which end of the configuration is used as the emitter. However, it has already been pointed out that in spite of this same handicap in the triple configuration, fairly satisfactory values of alpha were obtained.

As with the triple configuration, three parameters are available for a given set of semiconductor and doping impurities to use in controlling the width of the two central regions and the distribution of the impurities—time or temperature of diffusion, the degree of compensation of impurities in the initial crystal, and the addition of acceptor impurity to the re-grown region. The effect of increasing the time or temperature of diffusion, as might be expected, is to increase the width of the two central regions and in approximately the same ratio.

When additional acceptor impurity is added to the germanium melt during surface-melting to triple the concentration in the re-grown region from $A_2$ to $A_2'$, the distribution shown in curve *b* of FIG. 10(*b*) is obtained. Comparison with curve *a* reveals that only the two regions on the re-grown side of the boundary have been affected. The width of the central n-type region has been reduced to approximately one-half and the total excess donor concentration in it has been reduced by the square of that ratio.

On the other hand, when the degree of impurity compensation is reduced in the initial crystal, the impurity distribution is affected in all four regions but predominantly in the two regions on the initial side of the boundary. The comparison of the two distributions resulting from initial compensations of 90% and 70% is shown in FIGS. 11(*a*) and 11(*b*). The principal effect of this tripling of the excess donor impurity concentration in the initial crystal is to decrease the width of the central p-type region to about one-half and its total impurity content to about one-fourth.

The application of the technique of the present invention to produce germanium n-p-n transistors is illustrated by the following data. The germanium crystal contained $8\times10^{15}$ atoms/cc. of arsenic and $7\times10^{15}$ atoms/cc. of indium, corresponding to about 85% compensation of the impurities. The excess concentration of arsenic was $1\times10^{15}$ atoms/cc., and the n-type crystal had a resistivity of 2 ohm cm. When a slice of the crystal was surface-melted and cooled, the re-grown region was also n-type with a resistivity of 4 ohm cm. It contained about $5\times10^{14}$ atoms/cc. of arsenic (distribution coefficient 0.06) and a negligible concentration of indium (distribution coefficient 0.001). When the crystalline slice was then heated to about 925° C. for 5 minutes to allow diffusion of the arsenic out of the initial crystal region into the re-grown region, the diffusion of indium being comparatively negligible, a narrow p-type region was formed. Transistors fabricated from this material, using the re-grown region as emitter, had a current gain (alpha) of 0.95 and a frequency cut-off of 10 megacycles.

As many apparently widely different embodiments of the invention may be made without departing from the spirit and scope hereof, it is to be understood that the invention is not limited to the specific embodiments hereof except as defined in the appended claim.

What is claimed is:

A process for changing the conductivity types in a first portion and in a second adjacent portion of a semiconducting body, the change in said first portion caused by depletion of impurities and in said second portion by addition of the depleted impurities, said process comprising producing a semiconducting body having a first region of one conductivity type and a second region of the opposite conductivity type, each region containing two impurities, one impurity promoting said one conductivity and the other impurity promoting said opposite conductivity type, one of said impurity having a diffusion coefficient larger than said other impurity, the majority impurity in said first region being the more mobile impurity, the majority impurity in said second region being the less mobile impurity, the minority concentration in said first region being larger than one-half the sum of the majority concentration in said first region and the minority concentration in the said second region, the majority impurity concentration in said second region being less than one-half the sum of the majority concentration in said first region and the minority concentration in said second region, then subjecting said semiconducting body to solid state diffusion of impurities by heating said body below the melting point to effect diffusion of said more mobile impurities from said first region into said second region whereby a portion of said first region adjacent the junction between said first and said second region changes conductivity type by depletion of said more mobile impurities, and a portion of said second region adjacent said junction changes conductivity type by addition of said more mobile impurities diffusing from the said first region into said second region, thereby producing a structure having quadruple conductivity configuration.

References Cited in the file of this patent

UNITED STATES PATENTS

| | | |
|---|---|---|
| 2,793,145 | Clarke | May 21, 1957 |
| 2,819,990 | Fuller et al. | Jan. 14, 1958 |
| 2,836,521 | Longini | May 27, 1958 |
| 2,836,523 | Fuller | May 27, 1958 |
| 2,840,497 | Longini | June 24, 1958 |
| 2,883,313 | Pankove | Apr. 21, 1959 |
| 2,899,343 | Statz | Aug. 11, 1959 |
| 2,977,256 | Lesk | Mar. 28, 1961 |

FOREIGN PATENTS

| | | |
|---|---|---|
| 1,114,367 | France | Dec. 19, 1955 |